United States Patent [19]

Tanaka et al.

[11] 4,183,216
[45] Jan. 15, 1980

[54] SUPERCHARGED INTERNAL COMBUSTION ENGINE

[75] Inventors: Eizi Tanaka, Anjo; Michihiro Ohashi, Handa; Akira Nishimatsu, Okazaki, all of Japan

[73] Assignee: Nippon Soken, Inc., Nishio, Japan

[21] Appl. No.: 907,619

[22] Filed: May 19, 1978

[30] Foreign Application Priority Data

May 23, 1977 [JP] Japan .................................. 52-60315

[51] Int. Cl.² .............................................. F02B 37/08
[52] U.S. Cl. .................................................... 60/611
[58] Field of Search ......................... 60/600, 601, 611; 123/119 C

[56] References Cited

U.S. PATENT DOCUMENTS

| 3,049,865 | 8/1962 | Drayer | 60/611 |
| 3,568,435 | 3/1971 | May | 60/611 X |
| 3,651,636 | 3/1972 | Glassey et al. | 60/611 |

FOREIGN PATENT DOCUMENTS 47-18517   2/1977   Japan ....................................... 60/611

*Primary Examiner*—Michael Koczo
*Attorney, Agent, or Firm*—Cushman, Darby & Cushman

[57] ABSTRACT

A supercharged internal combustion engine is provided with a turbo supercharger mounted on an intake pipe and driven by engine exhaust gases to produce a pressurized intake air to be fed into the engine. A bypass intake pipe branches out of the intake pipe upstream of the supercharger and merges into the intake pipe at a point downstream of the supercharger. A first valve member is disposed in the intake pipe adjacent to the merging point to control the communication between the intake pipe and the bypass intake pipe and the communication between the upstream part of the intake pipe and the downstream part of the intake pipe. A first and second air release ports are formed in the intake pipe, one of which is disposed between the supercharger and the merging point and the other is disposed downstream of the merging point. Second and third valve members are provided to open and close the first and second air release ports, respectively. The first and second valve members are pneumatically actuated in accordance with the variation in the engine intake manifold pressure, whereas the third valve member is moved to its open position when the pressure in the intake pipe downstream of the merging point exceeds a predetermined level.

5 Claims, 2 Drawing Figures

SUPERCHARGED INTERNAL COMBUSTION ENGINE

BACKGROUND OF THE INVENTION

1. Field of the Invention

The present invention relates to a supercharged internal combustion engine and, more particularly, to an internal combustion engine equipped with a supercharger which is controlled in accordance with the operating conditions of the engine.

2. Description of the Prior Art

Engine superchargers include those of a mechanically driven type and exhaust gas pressure type. A supercharger of the second type is so-called "turbo supercharger". The conventional supercharged internal combustion engine is so designed as to be supercharged over the entire operational range from throttle part-open to full-open engine operating conditions. The engine is provided with either a bypass exhaust passage or a bypass intake passage to avoid unduly high supercharging pressure so that an increased engine output is obtained in the throttle full-open engine operating condition only.

Japanese Patent Laid-Open Publication No. 52-18517 laid-open on Feb. 12, 1977 for public inspection discloses a supercharged internal combustion engine which is so designed as to be supercharged not in throttle-part-open engine operating condition but in throttle-full-open engine operating condition. In the throttle-part-open engine operating condition, an intake passage is closed by a control valve so that pressurized air from a supercharger is released into the atmosphere through a release valve, while the engine is charged with the atmospheric pressure through an atmospheric air passage. In the throttle-full-open engine operating condition, however, the control valve closes the atmospheric air passage and opens the intake passage so that the pressurized air produced by the supercharger is introduced into the engine. The release valve is closed at this time. The valves are controlled by signals representative of air pressure in the intake manifold of the engine.

However, these conventional superchargers have various problems and shortcomings.

More specifically, the first-mentioned way of supercharging, i.e. the supercharging over the entire range of engine operation, is not advantageous in that the intake air is restricted or throttled by the throttle valve during the throttle-part-open engine operation to render the supercharging itself meaningless. In addition, especially in the exhaust-pressure type supercharging in which the exhaust gas is made to pass through a turbine, the exhaust pressure is increased to lower the intake efficiency of the engine, resulting in a reduced engine output. Further, the supercharging over entire range of engine operation forces the supercharger, exhaust system and the intake system to work under a permanent additional load. This is quite inconvenient from the view point of durability of these systems and the supercharger.

Turning now to the second-mentioned supercharging system as disclosed in the Japanese Patent Laid-open Publication No. 52-18517, the following disadvantage is pointed out. As stated before, the relief valve for allowing the compressed air to be released into the atmosphere is controlled to open and close solely dependent on the intake pressure, i.e. the discharge pressure of the blower of the supercharger. In other words, the relief valve is made to open at the same intake pressure irrespective of the operating condition of the engine. To explain in more detail, the intake pressure at which the compressed air is released during the throttle-part-open engine operation is equal to that at which the excessive supercharging pressure is released during the throttle-full-open engine operation. For instance, if the maximum allowable supercharging pressure in the throttle-full-open engine operating condition is predetermined to be +180 mmHg (gauge pressure), the relief valve starts release of air when the pressure in the supercharging intake air passage reaches +180 mmHg (gauge pressure). This will mean that the relief valve is kept closed, even in the throttle-part-open engine operating condition, until the pressure of air compressed by the blower of the supercharger reaches +180 mmHg (gauge pressure), with a result that a surging of the gas turbine occurs. The surging would be avoided by allowing the relief valve to open at a lower supercharging intake pressure, i.e., +50 mmHg (gauge pressure). However, this relief valve setting will inconveniently limit the maximum supercharging pressure in the throttle-full-open engine operating condition to a level as low as +50 mmHg (gauge pressure). Thus, the second-mentioned known supercharging system falls short of achieving such a control as to allow the release of compressed air at a low pressure during the throttle-part-open engine operation and to raise the supercharging air pressure in the throttle-full-open engine operation.

SUMMARY OF THE INVENTION

It is an object of the present invention to provide an improved supercharged internal combustion engine in which all the air pressurized by a supercharger is released into the atmosphere at an engine operating condition where a throttle valve is opened to its part-open position or less than that, in which all the pressurized air from the supercharger is introduced into the engine at an engine operating condition where the throttle valve is fully open but the supercharging intake pressure is lower than a predetermined level, and in which a part of the pressurized air from the supercharger is released into the atmosphere to keep the intake pressure at the predetermined level at an engine operating condition where the throttle valve is fully open and the supercharging intake pressure tends to exceed the predetermined level, whereby the engine output drop which would otherwise occur due to the provision of the supercharger is avoided, engine knocking which would otherwise occur due to an excessive supercharging at a heavy load engine operating condition, and the supercharger itself, the engine body, intake system the exhaust system are all prevented from being damaged.

According to the present invention, there is provided a supercharged internal combustion engine comprising:

an intake system including an intake pipe;

a turbo supercharger mounted on said intake pipe and driven by the engine exhaust gases to produce a pressurized intake air to be fed into the engine;

said intake system further including a bypass intake pipe merging with said intake pipe at a point downstream of said supercharger;

first and second air release ports formed in said intake pipe downstream of said supercharger;

said merging point being located between said first and second air release ports;

a first valve means disposed in said intake system at said merging point for selectively pneumatically connecting said bypass intake pipe to said intake pipe downstream of said merging point to interrupt the communication between said intake pipe upstream of said merging point and said intake pipe downstream of said merging point, and pneumatically disconnecting said bypass intake pipe from said intake pipe downstream of said merging point to pneumatically connect said intake pipe upstream of said point to said intake pipe downstream of said point;

second and third valve means mounted on said intake pipe upstream and downstream of said merging point, respectively, for opening and closing said first and second air release ports, respectively;

said first and second valve means being operative in response to changes of the engine operating conditions, and said third valve means being operative in response to the variation in the pressure of the supercharged intake air.

The above and other objects, features and advantages of the present invention will be made apparent by the following description with reference to the accompanying drawings.

DESCRIPTION OF PREFERRED EMBODIMENT

Figure 1:
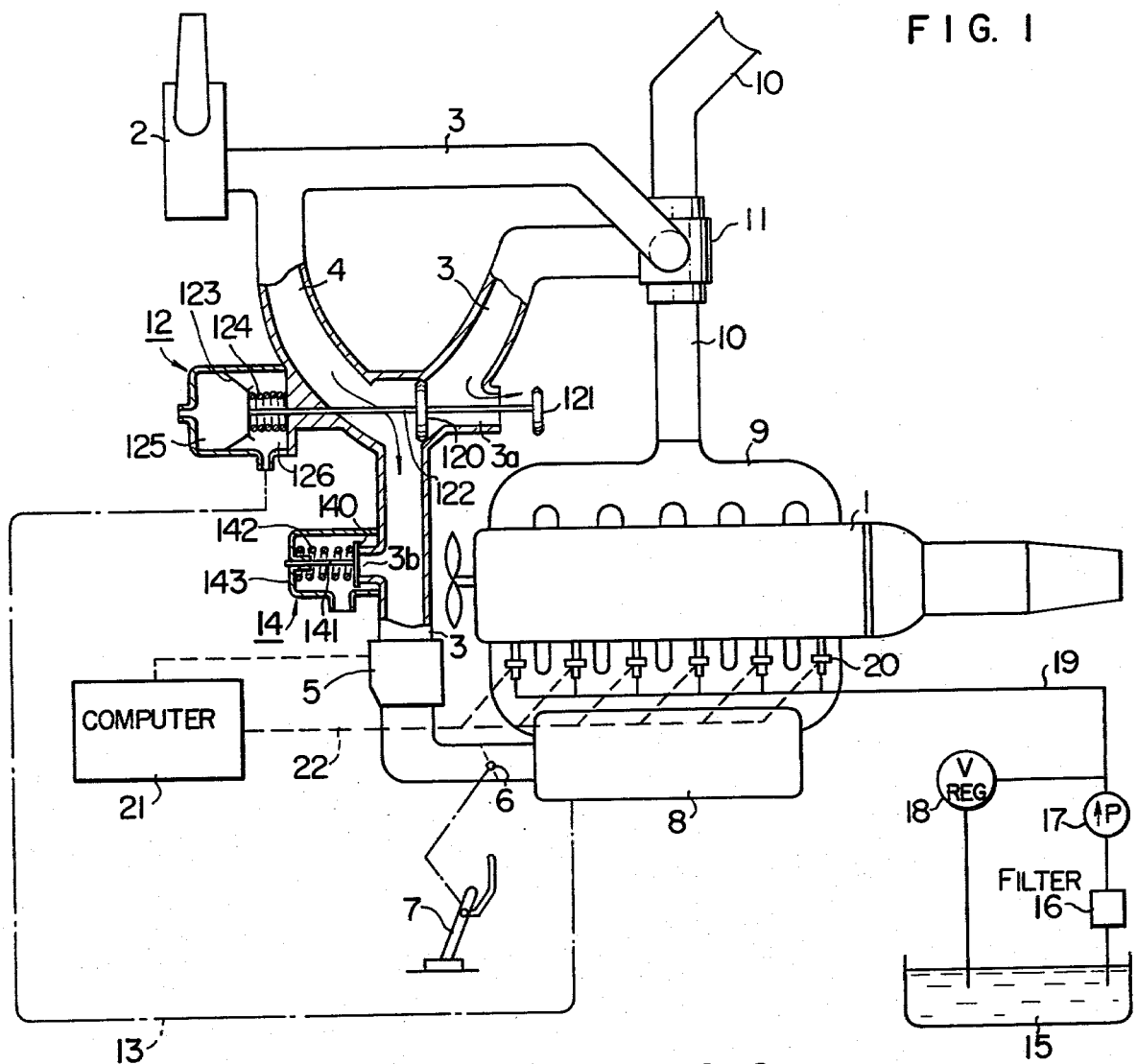
FIG. 1 is a partly sectional and partly diagrammatic illustration of a supercharged internal combustion engine embodying the present invention.

Referring first to FIG. 1, a supercharged internal combustion engine designated by reference numeral 1 has an intake pipe 3 through which air from an air cleaner 2 is introduced through a supercharger 11, to be described later, to the engine 1. An intake bypass pipe 4 extends in bypassing relationship to the supercharger 11 and has upstream and downstream ends connected to the intake pipe 3 upstream and downstream of the supercharger 11, respectively, to cause the air from the air cleaner 2 to bypass the supercharger 11 to the engine 1. A sensor 5 for detecting the intake air flow rate is mounted on the intake pipe 3 at a portion thereof downstream of the point at which the bypass pipe 4 merges with the intake pipe 3. A throttle valve 6 is disposed in the intake pipe 3 downstream of the sensor 5 and is operatively connected to an accelerator pedal 7. Reference numerals 8, 9 and 10 denote, respectively, an intake manifold, an exhaust manifold and an exhaust pipe.

An exhaust-pressure type supercharger (or so-called "turbo supercharger") 11 has a gas turbine which is disposed in the exhaust pipe 10 so as to be driven by the energy possessed by the exhaust gas flow. The gas turbine drives a blower of the supercharger which is disposed at an intermediate portion of the intake pipe 3 thereby to supercharge the engine.

An intake control valve generally designated by 12 has a first valve member 120 adapted to selectively open and close the intake pipe 3 and the bypass intake pipe 4, a second valve member 121 for opening and closing a first relief port 3a formed in the intake pipe 3, a valve rod 122 carrying the first and the second valve members 120 and 121, a diaphragm 123 connected to the valve rod 122, a spring 124 adapted to bias the diaphragm 123 in a direction to cause the intake bypass pipe 4 and the relief port 3a to be closed by the first and the second valve members 120 and 121, respectively, and first and second chambers 125 and 126 separated from each other by the diaphragm 123. The first chamber 125 is vented to the atmosphere, while the second chamber 126, in which the spring 124 is disposed, communicates with the intake manifold 8 through a pressure-transmitting passage 13.

An intake relief valve generally denoted by numeral 14 has a third valve member 140 adapted to selectively open and close a second relief port 3b formed in the intake pipe 3, a valve rod 141 on which the third valve member 140 is mounted, a spring 142 adapted to normally bias the third valve member 140 in a direction to close the second relief port 3b, and a casing 143 adapted to guide the valve rod 141.

The fuel circuit of the engine includes a fuel tank 15, a fuel filter 16, a fuel pump 17 for delivering the fuel, a fuel-pressure regulator 18 adapted to regulate the pressure of the fuel delivered from the fuel pump 17, a fuel conduit 19 and fuel injectors 20. A computer 21 is provided for controlling the rate of fuel injection by the fuel inectors 20, in response to a signal from the sensor 5 for detecting the intake air flow rate. The computer 21 emits a control signal which is transmitted to the fuel injectors 20 through a conductor 22.

In operation, the intake air flow rate is determined by the opening degree of the throttle valve 6 during the running of the engine and is metered by the flow rate detecting sensor 5. Upon receipt of the signal representative of the intake air flow rate delivered from the sensor 5, the computer 21 determines the optimum rate of fuel injection in relation to the intake air flow rate, and emits an output signal to the fuel injectors 20 so as to cause them to perform a fuel injection at the rate determined by the computer 21.

The fuel is continuously pumped up by the fuel pump from the fuel tank 15 through the filter 16 and is delivered to the fuel injectors 20 through the fuel conduit 19 at a constant pressure regulated by the regulator 18.

The intake air flow is throttle by the throttle valve 6 when the latter is opened to part-open position or less than that, so that a vacuum is produced in the intake manifold 8. This vacuum is transmitted through the pressure-transmitting passage 13 to the second chamber 126 of the intake control valve 12. Consequently, the diaphragm 123 is displaced to the right, as shown in FIG. 1, against the biasing force exerted by the spring 124, so that the bypass intake pipe 4 is fully opened and the intake pipe 3 is fully closed by the first valve member 120. At the same time, the second valve member 121 fully opens the first relief port 3a. Consequently, the atmospheric air is taken into the engine 1 through the bypass intake pipe 4. On the other hand, the air discharged from the supercharger 11 is released into the atmosphere through the first relief valve 3a, without establishing a substantial pressure in the intake pipe 3 upstream of the valve member 120. Meanwhile, the third valve member 140 of the intake relief valve 14 keeps the second relief port 3b closed since the pressure in the intake pipe 3 downstream of the valve member 120 is as low as the atmospheric pressure.

It will be seen that the gas turbine is relieved from the load which would be applied to the turbine if the intake air pressure were high. Consequently, the increase of the exhaust pressure of the engine 1 is restrained to diminish the decrease of intake efficiency which would otherwise be caused by the provision of the supercharger 11, thereby to minimize the reduction of the engine output.

In the full throttle-opening operation including an abrupt acceleration of the engine, if the supercharging pressure is in a lower range, e.g. between −20 and +180 mmHg (gauge pressure), a small vacuum or a positive pressure is introduced into the second chamber 126 of the valve 12, so that the diaphragm 123 is displaced to the left almost solely by the biasing force of the spring 124. Consequently, the first valve member 120 is moved to close the bypass intake pipe 4 and to allow the intake pipe 3 to fully open. At this time, the second valve member is moved to close the first relief port 3a. The supercharging pressure in the low pressure range referred to above is insufficient to force the third valve member 140 of the intake relief valve 14 to open the second relief port 3b. Consequently, the whole parts of the air compressed and discharged by the supercharger 11 are forced into the engine 1 to contribute to an increase in the engine output.

As the supercharging intake pressure grows larger, e.g. up to +180 mmHg or higher during the throttle-full-open engine operation, the third valve member 140 of the intake relief valve 14 is moved against the spring 142 by the increased supercharging intake pressure to allow the second relief port 3b to open, although the intake control valve 12 functions in the same manner as in the foregoing operation with lower supercharging intake pressure. Consequently, a part of the intake air is released from the intake pipe 3 to maintain a predetermined supercharging intake pressure in the intake pipe 3 downstream of the valve member 120, i.e., to preclude excessively high supercharging intake pressure.

It will be appreciated that, because the supercharger 11 functions substantially only when a large engine output is needed and because the supercharging pressure is always lower than a predetermined level, not only the supercharger 11 itself but also the exhaust system and even the intake system of the engine are saved from being subjected to continuous loads, with resultant increase in the durability.

Figure 2:
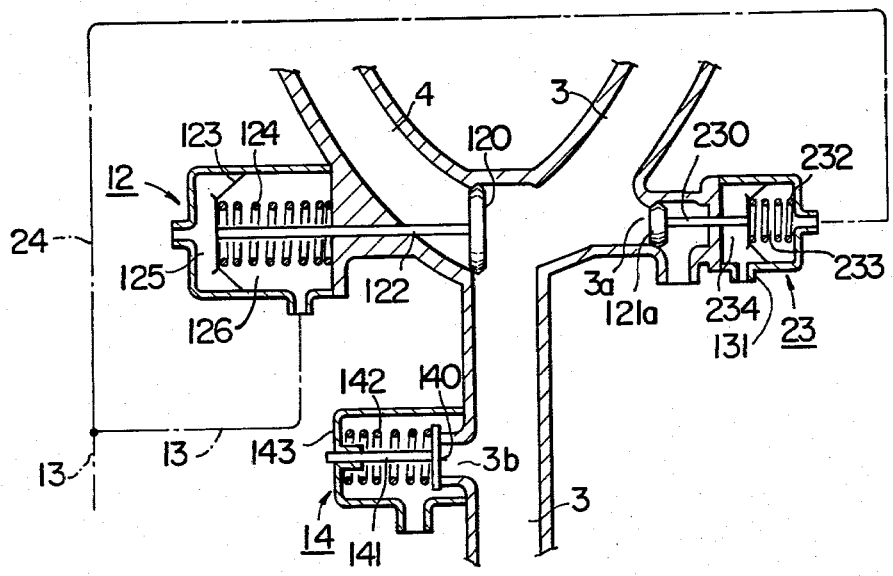
FIG. 2 illustrates in sectional view a modification of the embodiment shown in FIG. 1.

FIG. 2 shows a modification of the described embodiment, wherein the second valve member 121 of the intake control valve 12 of the described embodiment is replaced by an independently operable second valve member 121a. More specifically, the second valve member 121a is incorporated into an air release valve 23 which includes a valve rod 230 carrying at its one end the second valve member 121a, a diaphragm 231 connected to the other end of the valve rod 230, a spring 232 adapted to bias the diaphragm 231 in a direction to move the second valve member 121a to close the first relief port 3a, and first and second chambers 233 and 234 separated by the diaphragm 231 from each other.

The first chamber 233, in which the spring 232 is disposed, is connected through a pressure-transmitting passage 24 to the pressure-transmitting passage 13, while the second chamber 234 is opened to the atmosphere.

The intake control valve 12 and the relief valve 14 remain unchanged.

The air release valve 23 will be described in more detail. When the throttle valve 6 is opened to its part-open position or less than that, a vacuum is produced in the intake manifold 8 and transmitted to the first chamber 233 of the air release valve 23 through the pressure-transmitting passages 13 and 24. The force exerted by the vacuum to the diaphragm 231 is strong enough to overcome the biasing force of the spring 232 and thus move the second valve member 121a to open the first relief port 3a.

During a throttle-full-open engine operation, including an abrupt engine acceleration, if the super-charging intake pressure is in a relatively low range of, for example, from −20 mmHg to +180 mmHg, a small vacuum or positive pressure is applied to the first chamber 233, so that the diaphragm 231 is deflected leftwards, as viewed in FIG. 2, by the force of the spring 232. Consequently, the second valve member 121a closes the first relief port 3a. When the supercharging intake pressure is increased to, for example, +180 mmHg (gauge pressure) or higher than that during the throttle-full-open engine operation, the increased intake pressure is introduced into the first chamber 233. Consequently, the diaphragm 231 is kept deflected leftwards, as viewed in FIG. 2, by the combined force produced by the increased air pressure and the spring 232 to keep the first relief port 3a closed by the second valve member 121a.

It will be seen that the operation of the second valve member 121a is similar to that of the second valve member 121 of the embodiment described with reference to FIG. 1.

In the described embodiment and the modification thereof, the first and the second valve members are pneumatically actuated in accordance with the pressure in the intake manifold 8 of the engine 1. The first and second valve members, however, may alternatively be mechanically connected to the throttle valve 6 so as to be directly operated thereby. Further alternatively, the valve members may be driven by solenoids which are energized and deenergized in accordance with the degree of opening of the throttle valve 6.

As having been described, according to the present invention, all parts of the air compressed by supercharger are released into the atmosphere at an engine operating condition where the throttle valve is opened to its part-open position or less than that. Consequently, the pressure in the intake system downstream of the supercharger is maintained as low as the atmospheric pressure, so that the surging of the supercharger does not occur. In addition, since the turbine of the supercharger is relieved from unduly high load, the exhaust pressure is restrained from being increased, whereby the reduction of the engine output which would otherwise occure due to the provision of the supercharger is minimized.

When the throttle valve is fully open but the supercharging air pressure is lower than a predetermined pressure level, all the compressed air from the supercharger is fed into the engine to efficiently increase the engine output. When the supercharging air pressure rises beyond the predetermined pressure level at the throttle-full-open engine operating condition, a part of the supercharging air pressure is released into the atmosphere to the intake air pressure at the predetermined constant level to advantageously avoid engine knocking which would otherside be caused by an excessively high supercharging pressure, and to highly improve the durability of the supercharger itself, the engine body and the exhaust and intake systems of the engine as well.

What is claimed is:

1. A supercharged internal combustion engine comprising:
   an intake system including an intake pipe;
   a turbo supercharger mounted on said intake pipe and driven by the engine exhaust gases to produce a pressurized intake air to be fed into the engine;

said intake system further including a bypass intake pipe merging with said intake pipe at a point downstream of said supercharger;

first and second air release ports formed in said intake pipe downstream of said supercharger;

said merging point being located between said first and second air release ports;

a first valve means disposed in said intake system at said merging point for selectively pneumatically connecting said bypass intake pipe to said intake pipe downstream of said merging point to interrupt the communication between said intake pipe upstream of said merging point and said intake pipe downstream of said merging point, and pneumatically disconnecting said bypass intake pipe from said intake pipe downstream of said merging point to pneumatically connect said intake pipe upstream of said point to said intake pipe downstream of said point;

second and third valve means mounted on said intake pipe upstream and downstream of said merging point, respectively, for opening and closing said first and second air release ports, respectively;

said first and second valve means being operative in response to changes of the engine operating conditions, and said third valve means being operative in response to the variation in the pressure of the supercharged intake air.

2. A supercharged internal combustion engine according to claim 1, wherein said first valve means includes a first valve member movably disposed in said intake system at said merging point, and a pneumatic actuator pneumatically connected to said intake pipe downstream of an engine throttle valve for pneumatically controlling said first valve member, said throttle valve being disposed in said intake pipe downstream of said second air release port.

3. A supercharged internal combustion engine according to claim 2, wherein said second valve means comprises a second valve member mechanically connected to said first valve member for movement therewith to open and close said first air release port.

4. A supercharged internal combustion engine according to claim 2, wherein said second valve means includes a second valve member disposed adjacent to said first air release port and a second pneumatic valve actuator pneumatically connected to said intake system downstream of said throttle valve for pneumatically controlling said second valve member.

5. A supercharged internal combustion engine according to claim 2, 3 or 4, wherein said third valve means includes a third valve member and a spring member biasing said third valve member in a direction to close said second air release port.

* * * * *